(12) United States Patent
Gattrell et al.

(10) Patent No.: US 7,232,507 B2
(45) Date of Patent: Jun. 19, 2007

(54) HIGH VOLUMETRIC EFFICIENCY ELECTROCHEMICAL CELL DESIGN FOR TREATMENT OF LOW CONCENTRATIONS OF CONTAMINANTS IN LOW CONDUCTIVITY WATER

(75) Inventors: Michael Gattrell, Ottawa (CA); Thierry Guena, Montreal (CA); Barry MacDougall, Ottawa (CA)

(73) Assignee: National Research Council of Canada, Ottawa (CA)

( * ) Notice: Subject to any disclaimer, the term of this patent is extended or adjusted under 35 U.S.C. 154(b) by 417 days.

(21) Appl. No.: 10/653,132

(22) Filed: Sep. 3, 2003

(65) Prior Publication Data

US 2004/0108222 A1 Jun. 10, 2004

Related U.S. Application Data

(60) Provisional application No. 60/407,710, filed on Sep. 4, 2002.

(51) Int. Cl.
- C25B 9/20 (2006.01)
- C25C 7/04 (2006.01)
- C02F 1/461 (2006.01)

(52) U.S. Cl. .................. 204/275.1; 204/242; 204/263; 204/278.5; 204/288.1; 204/288.4; 204/288.5; 205/742; 205/758

(58) Field of Classification Search .............. 204/242, 204/267–269, 288.1, 255–258, 275.1, 263, 204/278.5, 288.4, 288.5; 205/742, 758–759
See application file for complete search history.

(56) References Cited

U.S. PATENT DOCUMENTS

| | | | | |
|---|---|---|---|---|
| 4,207,165 A | * | 6/1980 | Mose et al. ................. 204/258 |
| 4,238,326 A | * | 12/1980 | Wolf .......................... 210/695 |
| 4,589,968 A | * | 5/1986 | Toomey, Jr. ................. 204/257 |
| 4,830,936 A | * | 5/1989 | Planchat et al. ............ 429/110 |
| 5,256,268 A | * | 10/1993 | Goto et al. .................. 204/268 |
| 6,821,398 B2 | * | 11/2004 | Von Broembsen ....... 204/278.5 |

* cited by examiner

Primary Examiner—Roy King
Assistant Examiner—Lois Zheng
(74) Attorney, Agent, or Firm—J. Wayne Anderson

(57) ABSTRACT

An electrochemical cell design is disclosed for the particular application of the electrochemical treatment of contaminants in water. The cell is designed to allow the treatment of low concentrations of contaminants in low conductivity water efficiently, and to be simple to fabricate. The design incorporates tapered inlet and outlet fluid flow manifolds so that the cell pressure drop will be almost entirely due to fluid contacting the electrodes, thus maximising the effective use of the system pump power. A short anode to cathode distance and thin working electrodes are used to minimise resistive electrical power losses. The parallel slacked arrangement of the electrodes and the smooth inlet and outlet designs leads to relatively even distributions of current density and mass transfer resulting in maximal utilisation of the entire active electrode surface area. The electrodes are connected internally in parallel in monopolar stack modules, and the modules are then connected externally in series, with insulating baffles to minimise current by-pass problems. This provides a simple cell construction (a minimum number of simple insulating baffles) while still simplifying the cell wiring and reducing the cell current demand (allowing lighter wiring to be used).

11 Claims, 9 Drawing Sheets

— Counter electrodes
--- Plastic mesh separator
▨ Working electrode

HIGH VOLUMETRIC EFFICIENCY ELECTROCHEMICAL CELL DESIGN FOR TREATMENT OF LOW CONCENTRATIONS OF CONTAMINANTS IN LOW CONDUCTIVITY WATER

CROSS-REFERENCE TO RELATED APPLICATION

This application claims priority from U.S. Provisional Application No. 60/407,710, filed Sep. 4, 2002.

TECHNICAL FIELD

The invention relates to the design of electrochemical cells for the application of the electrochemical treatment of contaminants in water. Further this design incorporates novel ideas to allow the treatment of low concentrations of contaminants in low conductivity water using an efficient and simple (and therefore low fabrication cost) electrochemical cell.

BACKGROUND OF THE INVENTION

For water treatment systems running in acidic or poorly buffered neutral solutions, anodes which are stable in acid are required. Such stable anodes are typically fabricated as active coatings on a corrosion resistant valve metal substrate (for example, but not limited to: titanium, tantalum, and zirconium. See, for example, G. P. Vercesi, J. Rolewicz, Ch. Comninellis, E. Plattner, and J. Hinden, "Characterization of DSA-Type Oxygen Evolving Electrodes. Choice of Base Metal", Thermochimica Acta, vol. 176, pp. 31–47, (1991). The coatings used (for example, but not limited to: platinum, iridium dioxide, mixed platinum and iridium dioxide, doped tin dioxide, lead dioxide (with and without doping), and doped diamond) are expensive. Therefore it is important when using such anodes, that the cell design ensures that the entire electrode area is effectively used in order to minimise the electrode area required to treat a given volume of contaminated water. Specifically this means that one desires a design that allows for a high and even current density from the anode, and a corresponding high and even mass transport to deliver the solution contaminants to the anode surface at a sufficient rate. It should be understood, however, that while this design provides the greatest advantage with expensive electrode materials such as those described above, it still also provides some advantage for applications with lower cost electrodes (anodes or cathodes) and/or in alkaline solutions.

To treat solutions with low concentrations of contaminants requires good mass transport to deliver the contaminants to the electrode surface. Mass transport is proportional to momentum transport and therefore linked to pressure drop. Thus a cell with high rates of mass transport will also have a high pressure drop. A good cell design must therefore be able to operate with high inlet pressures, and to cause little or no "non-useful" pressure drops in the cell inlet and outlet to avoid wasting pump power. In other words, ideally all the cell pressure drops would be "useful"; due to the interaction of the fluid flow with the working electrodes (i.e. the electrodes at which the desired reaction or reactions are occurring). In order to operate with a high inlet pressure while being inexpensive to fabricate, a cell design must have minimal openings and gaskets, which might leak at high pressure. In order to minimise "non-useful" pressure drops the cell inlet and outlet must avoid abrupt changes in flow velocity or direction (i.e. minimal flow constrictions or corners).

As well as minimising the electrode area required to treat a given volume of contaminated water, the design should also minimise the cell size to minimise the fabrication costs. This requires maximising the electrode area per cell volume. Thus the goal of this cell design is to provide the cheapest possible system while retaining optimal performance.

DESCRIPTION OF THE PRIOR ART

Standard plate and frame cells are not good for such an application. L. Carlsson, B. Sandegren, D. Simonsson, and M. Rihovsky, "Design and Performance of a Modular, Multi-purpose Electrochemical Reactor", Journal of the Electrochemical Society, Vol. 130, No. 2, pp. 342–6, (1983) describes such cells. The inlets and outlets have abrupt corners and, in particular for bipolar designs, the inlets and outlets are often narrow and constricted to avoid current by-passing the cells. These cells are also more expensive than, for example, tank cells because of the many gaskets and spacer plates that must be fabricated. The numerous gaskets also limit the maximum pressure drops across such cells without leakage. Thus a better cell design should minimise entrance and exit pressure drops, and minimise the number of parts to be fabricated.

Tank cells while cheap to fabricate cannot provide high rates of mass transport because their open top design limits the maximum flowrates that can be used.

Another approach used in many electrochemical systems for treatment of wastewater with low concentrations of contaminants, is the use of electrodes of three dimensional geometry. Designs of three dimensional electrodes are described in U.S. Pat. No. 4,308,122, (1981), S. Das Gupta et al, U.S. Pat. No. 5,690,806 (1997), J. G. Sunderland et al and D. Pletcher and F. Walsh, "Industrial Electrochemistry", Chapman and Hall, London, U.K., (1993). These electrodes provide a large surface area and can effectively generate turbulent flow thus allowing for cell designs of high volumetric reaction rate (high electrode area per cell volume). However, these designs are most effective when thick and/or high surface area per volume three dimensional electrodes are used. Unfortunately, three dimensional electrodes also suffer from problems with voltage variations within the electrode structure. These voltage variations are related to variations in current density, which can lead to uneven electrode utilisation and lifetime. The voltage variations are a function of many factors but generally become more severe with: increasing electrode thickness, increasing current density, increasing electrode specific area, decreasing solution conductivity, and decreasing electrode void volume. Thus most prior cell designs using thick three dimensional electrodes are applicable only to treating high conductivity solutions or with low cost electrode materials where low production rates (and hence low current densities) or poor electrode utilisation can be tolerated. Thus, for low conductivity solutions and higher electrode production rates, the effective electrode thickness is limited. This requires a new cell design for these applications. A further concern with some low void volume three dimensional electrodes is possible plugging problems if treating solutions with a high solids content.

Another proposed design is the so-called "Swiss roll" type of cell, shown in P. M. Robertson, F. Schwagner, and N. Ibl, "A New Cell for Electrochemical Processes", Journal of Electroanalytical Chemistry, Vol. 65, pp. 883–900, (1975).

This uses metal screen anodes and cathodes separated by a porous insulator (such as plastic mesh or cloth), which are rolled together in a cylindrical arrangement. This design is inexpensive and provides short anode to cathode distances and large electrode areas in a small volume. However, the design is not suitable for coated electrodes, which cannot be rolled up without damaging the coating, and because it is a monopolar cell design, problems arise handling the resulting large current flows which would occur if it is scaled-up and/or run at high production rates (i.e. high electrode current density).

Also, a recent design using an open sided cell with stacked electrodes has been reported in G. D. Zappi and N. L. Weinberg, U.S. Pat. No. 6,315,866 (2001). This is a low cost cell design that can use coated electrodes, and provides for a large electrode area in a small volume. However, the fluid flow through the cell is not evenly distributed and high fluid velocities may be problematic, which is not desirable for effectively using expensive electrodes for treating low concentrations of contaminants. Also the cell is a monopolar design, and so if scaled up would require large currents to operate.

SUMMARY OF THE INVENTION

The cell design according to the invention provides an improvement over existing cell designs for the application of electrochemical oxidative treatment of contaminated water. Specifically it offers advantages for treating water solutions of low conductivity. It also provides advantages for treating water solutions containing low concentrations of contaminants. In addition to these advantages, the cell design offers particular advantages when working with solutions with acidic or poorly buffered neutral pH where expensive electrodes often have to be used.

According to one embodiment of the invention, an electrochemical cell is provided, comprising a plurality of electrode modules separated by electrically insulating spacers and electrically connected in series, each electrode module including a series of alternating anodes and cathodes separated by an electrically insulating porous material spacer, the electrodes being electrically connected in parallel.

According to another embodiment of the invention, a method is provided for the electrochemical treatment of contaminated aqueous solutions, comprising flowing the contaminated aqueous solution through an electrochemical cell as defined above, while passing an electrical current through the cell.

DETAILED DESCRIPTION OF THE INVENTION

Figure 2:
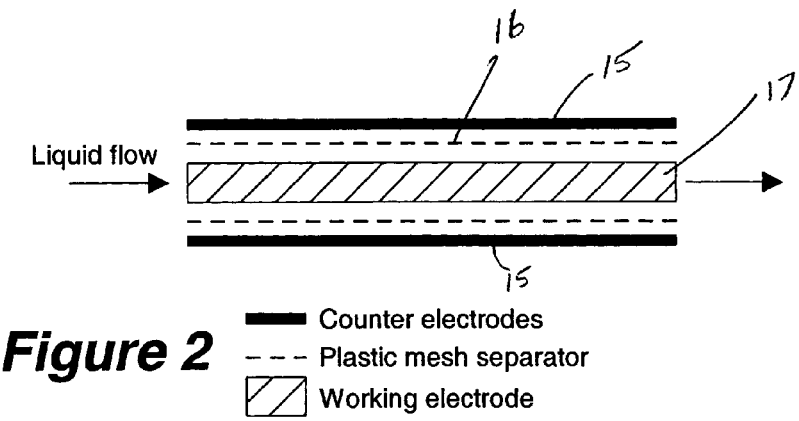
FIG. 2. Detail showing one possible arrangement of the electrodes in the cell. In this case with the liquid flow through a porous working electrode and insulating separators, with solid counter electrodes.

The cell design starts from a monopolar sandwich type arrangement of thin electrodes 15 and 17, separated by a plastic mesh or screen or some other porous insulating material 16 (as shown in FIG. 2). This arrangement minimises the anode-cathode distance to reduce the cell voltage. Also, by using a thin working electrode 17 with current flow from both faces, it results in minimal voltage variations (and hence current variations) if porous or thin three-dimensional electrodes are used. This allows higher production rates and the treatment of lower conductivity solutions to be achieved. These thin electrodes can be in any form. Some commonly available forms are: plate, mesh, stacked meshes, stacked screens, screen-wrapped plate (as shown in U.S. Pat. No. 5,972,181, 1999, R. J. Coin, et al), or thin three dimensional structures (for example, but not limited to: sintered metal fibre mat, such as one shown in U.S. Pat. No. 5,294,319, 1994, J. J. Kaczur et al, or metal foams). The disclosures of these patents are incorporated herein by reference. See FIG. 5.

Figure 1:
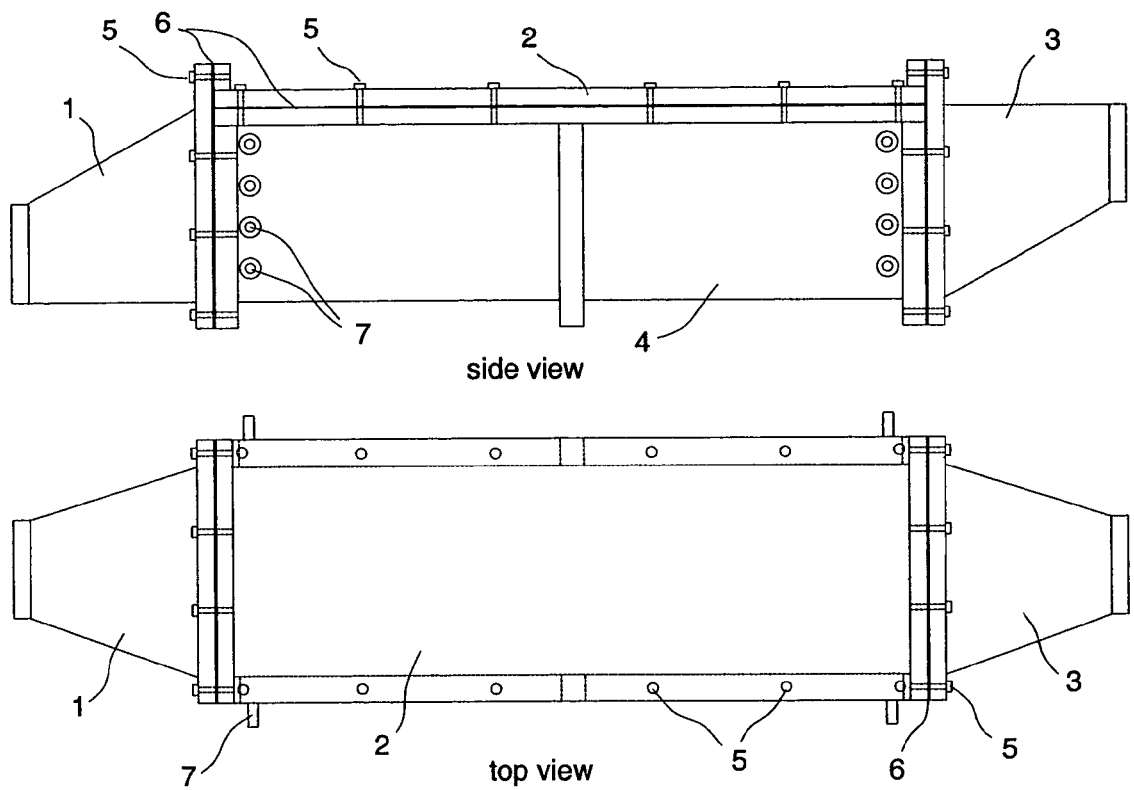
FIG. 1. Side and top views of the electrochemical cell showing the assembly of the cell body, top, inlet, and outlet pieces.
Figure 3:
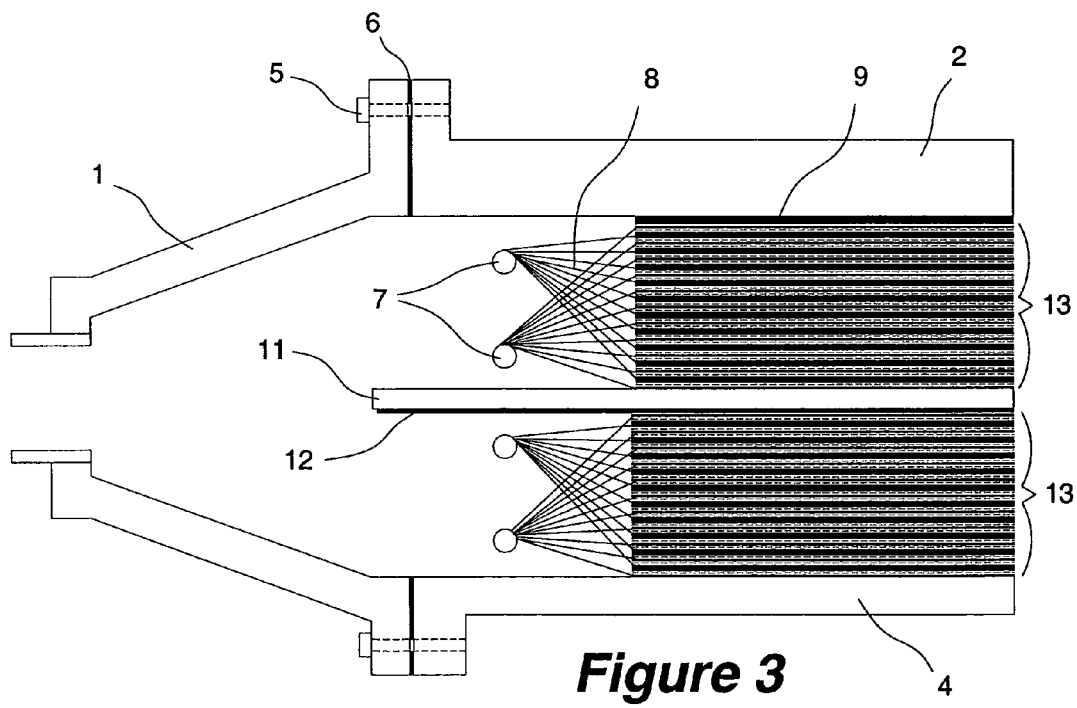
FIG. 3. Cell cross-section showing electrode wiring and cell flow entrance, showing two electrode stacks, ten anodes and eleven cathodes, in series with one insulating baffle between the two stacks.

This arrangement of electrode cell modules is repeated to build an electrode stack, thus providing a reasonably good electrode area per cell volume. This arrangement can then be fit into a tank type cell 4 having a closed water-tight top 2, attached to the tank by bolts 5 and sealing gaskets 6. Tapered inlet 1 and outlet 3 manifolds 4 are attached to the tank 4 in a water-tight manner e.g by bolts 5 and sealing gaskets 6, as shown in FIGS. 1 and 3. The tapered outlet manifold 3 is shown tapering upwardly to allow gases to escape, while the inlet manifold 1 tapers downwardly to allow cell drainage (as in FIG. 1) or be centred to provide even flow to the electrode stacks (as in FIG. 3). Such tapered inlet and outlet manifolds avoid unnecessary pressure drops and provide even flow, and hence relatively even mass transport, to the electrodes in the electrode stack. Thus this design achieves: a large electrode area in a compact volume, short anode to cathode distance with thin electrodes, smooth inlet/outlet flow patterns for minimal pressure drop, and a simple "tank cell" type fabrication with few parts and gaskets.

A key to implementing this design is the method of electrically connecting the electrodes in the electrode stack. Typical cell designs use either a monopolar or bipolar method of electrically connecting the electrodes. A monopolar electrode set-up offers the advantages that current can be collected from both faces of the electrode, which reduces the total cell voltage drop (for the same total electrode current), and for the case of an open structured (i.e. non-solid)

electrode it also decreases the electrode voltage and current density variations. However, because such a set-up puts all the electrodes in parallel, it results in a low cell voltage and very high cell currents. Low voltage and high current not only requires a more expensive power supply for equal power, but requires numerous connections with heavy bus bars making the cell fabrication more expensive.

A bipolar system, with the electrodes electrically connected in series, requires low current at higher voltages and far less wiring with ideally only two connections required through the cell walls. Unfortunately, the electrode fabrication is more complicated because of the fact that the bipolar electrodes must be anodic on one side and cathodic on the other. Also because of the large voltage differences that exist between different parts within the cell, stray currents (referred to as by-pass currents) can result in wasted electrical power and in some cases lead to corrosion of parts of the cell wiring or electrodes. This is usually overcome using insulating spacers and/or long inlet and outlet paths to each electrode pair. Thus the savings in simpler wiring and a less expensive power supply are offset by the greater expense of the fabrication of the bipolar plates and the insulating spacers, and a higher system pressure drop due to longer and thinner inlet and outlet paths.

Figure 4:
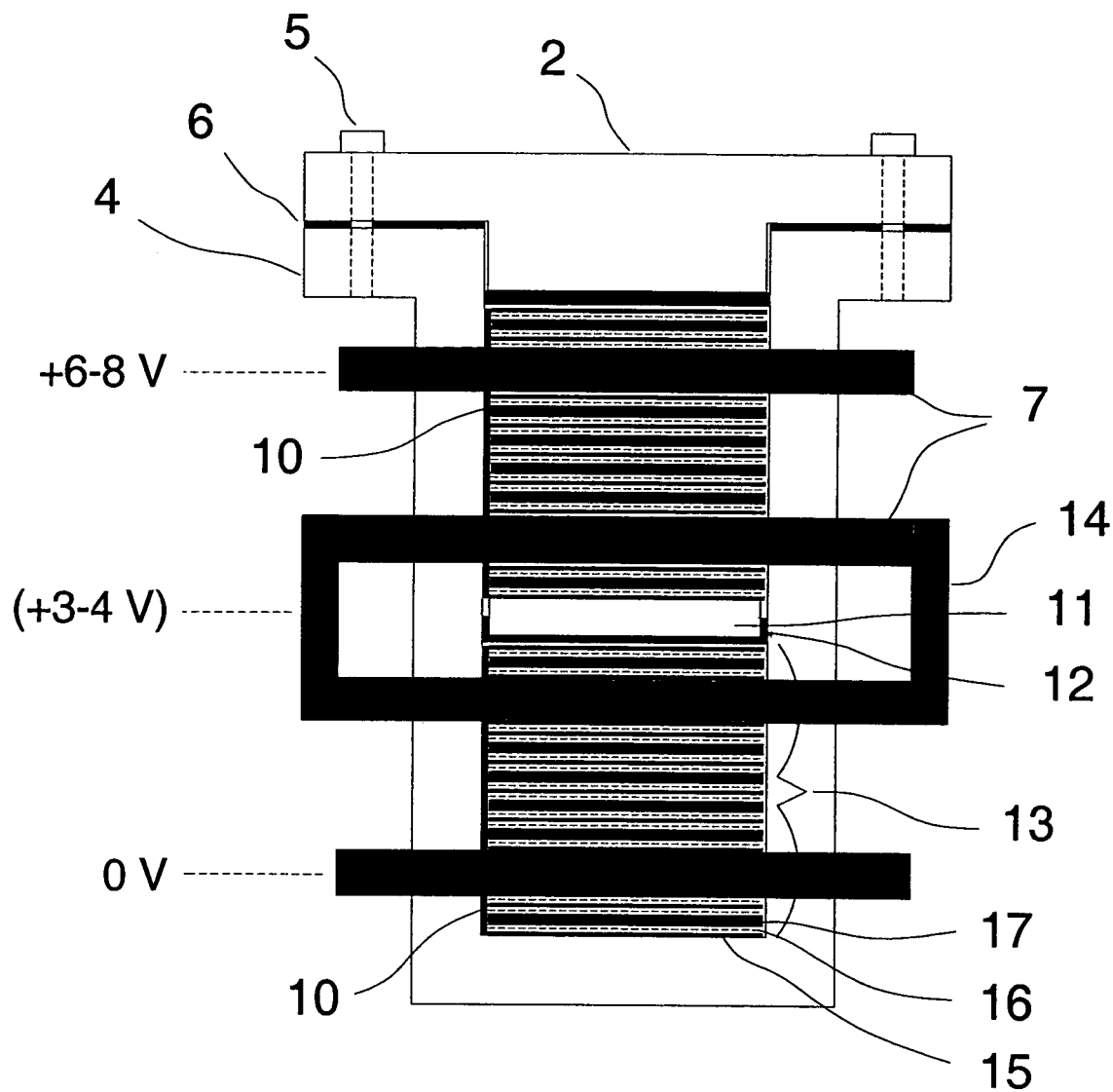
FIG. 4. End cross section of the small cell in FIG. 3 showing the external series connections between the electrode stacks.
Figure 7:
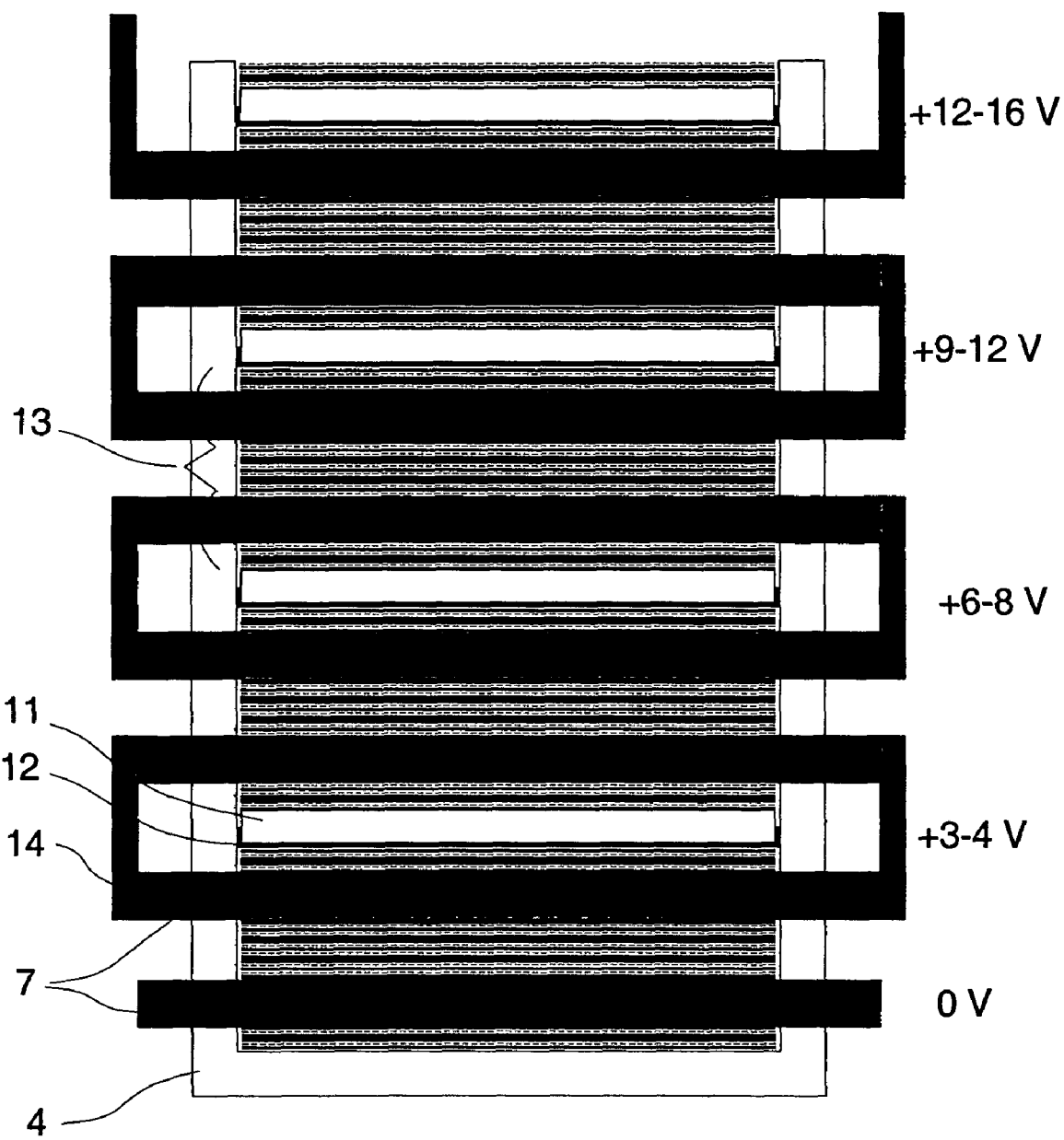
FIG. 7. End cross-section, similar to FIG. 4, but for a larger scale system showing how the cell can easily be scaled-up with stack modules connected in series.

This problem has been overcome in this invention by a cell design using a novel wiring design. The novel design is a mixture of monopolar and bipolar approaches as shown in FIGS. 3, 4, and 7. The alternating anodes and cathodes in each module are connected to each other internally, in parallel. The stack modules, are separated by insulating spacers 11 and, in turn, connected in series to make the full cell stack. An electrically insulating spacer sealing gasket 12 is provided between each stack 13 and spacer 11. A top of stack sealing gasket 9 is also provided between the top stack 13 and the tank top 2. As best seen in FIG. 4, a stack side sealing gasket 10 is provided between the stack side and the tank 4. This allows the advantages of a monopolar design to be achieved within each stack module, and by connecting each module in series, simpler wiring and a lower cell total current demand can be realised (allowing lighter wiring and a less expensive power supply to be used). Because the insulating spacers 11 are only used between each monopolar stack 13, simpler construction and wider liquid channels with minimal pressure drop can be achieved.

Thus this design achieves: a large electrode area in a compact volume, short anode to cathode distance with thin electrodes, minimal voltage variations even at high production rates with low conductivity solutions, smooth inlet/outlet flow patterns for minimal pressure drop and even mass transport, and a wiring design using a series connection of monopolar modules allowing simple assembly and fluid flow while reducing the complexity of the cell wiring and minimising the total cell current demand.

The exact nature of the anodes and cathodes used in the electrode stack can be chosen to provide optimal performance for a particular application. As well as the choice of cathode material and anode material (where the electrode material could comprise a substrate and coating), the electrode geometry can be varied as long as it remains suitable for forming an electrode stack. Preferably, the electrodes are arranged in parallel to minimize pressure drop as the contaminated liquid passes through the electrodes. For example, wherein the substrate is of a metal selected from the group consisting of titanium, tantalum and zirconium, the coating is selected from the group consisting of platinum, iridium dioxide, mixed platinum and iridium dioxide, doped tin dioxide, lead dioxide, doped lead dioxide, substiocometric titanium dioxide and doped diamond.

Figure 5:
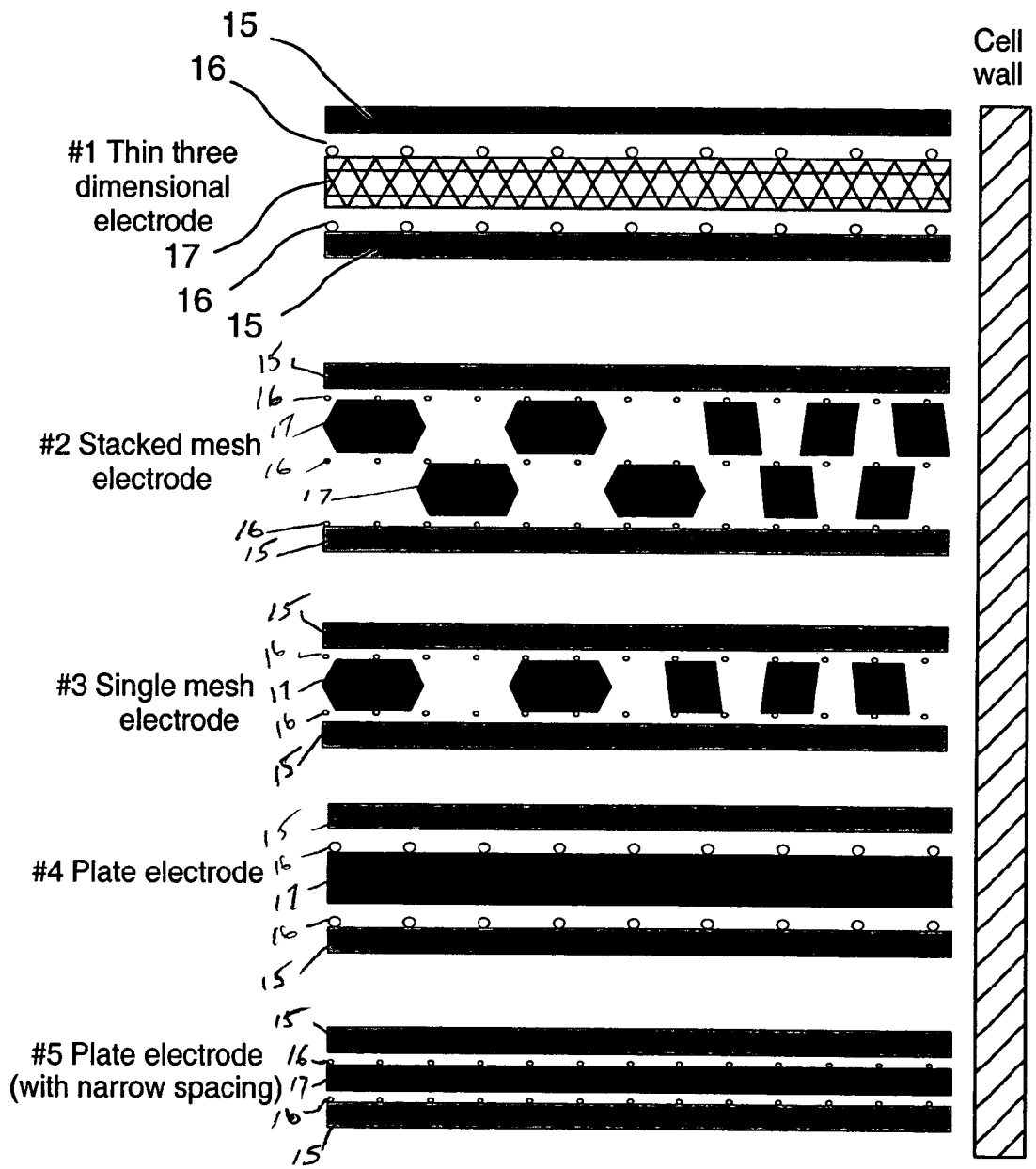
FIG. 5. Various arrangements of metal mesh and plates that can be used to build-up an electrode stack. For the mesh arrangements the cross section depends on where one cuts through the mesh and so two different types of cross section are shown to illustrate this difference.

A number of factors are important in determining the best electrode geometry including: mass transport developed per pump power, active area per dollar, availability (especially for coated electrodes), potential and current variation (which are related to coating lifetime and efficiency variations), total anode-cathode voltage drop, and void volume (which effects fluid channelling). As discussed previously, some possibilities for the thin anodes can be: plate, mesh, stacked screen, stacked meshes, screen wrapped plate (see above mentioned U.S. Pat. No. 5,972,181), or thin three dimensional structures, for example, but not limited to: sintered metal fibre mat (see above mentioned U.S. Pat. No. 5,294,319) or metal foams. Some examples of electrode stacks are shown in FIG. 5.

Two key parameters that would be considered in deciding on the best arrangement would be the concentration of the contaminant and its desired reaction rate (and hence the desired current density to be used), and the conductivity of the solution being treated. Also, the dimensions of the electrodes will depend upon the application. However, in all cases, the electrodes are dimensioned to provide for liquid passage through the cell in a generally unimpeded manner to minimize inlet to outlet pressure drop. For the case of low reaction rate and high conductivity, the goal would be to have the maximum electrode area per volume installed in the cell. This would dictate that designs with thin three-dimensional electrodes or stacked meshes should be used (examples #1 and #2 in FIG. 5). At higher current densities and/or with lower conductivity solutions where voltage variations in the anode are more severe, thinner and lower surface area to volume electrodes would be used such as a single mesh or a flat plate (examples #3 and #4 in FIG. 5). In all the example designs, the insulating plastic mesh separator between the anode and cathode would be as thin as possible to minimise the anode to cathode voltage drop (which represents a loss of power), but must not be so thin as to cause excessive pressure drop across the electrode stack module. Excessive pressure drop in this case is considered to be such that would cause a significant amount of the fluid flow to go around the electrode stack module rather than through it (referred to herein as channelling). This is shown in Example #5 in FIG. 5 where the anode-cathode spacing is small relative to the gap between the electrode stack and the cell wall, which would most likely lead to excessive channelling around the stack. These particular examples also use a solid counter electrode so that for Examples #1, #2, and #3 the main liquid flow is through the working electrode in order to maximise the use of the pump power for generating mass transport at the working electrode. It should also be noted that these examples are meant to be illustrative of the flexibility of the design, and are not to be taken to represent all possible designs.

Figure 6:
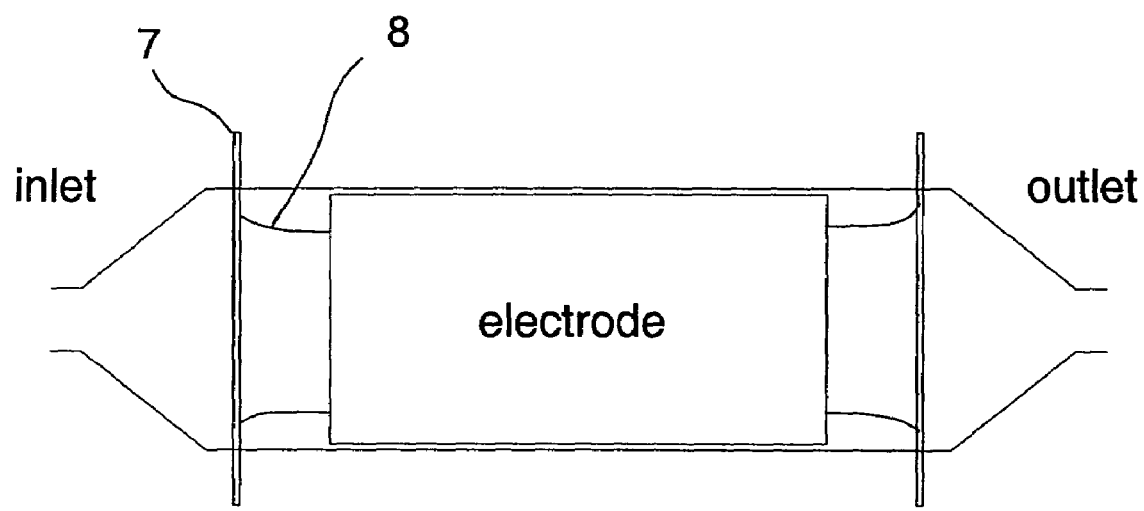
FIG. 6. Top view of the system wiring showing how electrodes can be connected to the bus bar rods at one or both ends of the cell.

The modular electrode arrangement chosen is then used to form a stack of electrode modules. The stack modules are connected in series in a monopolar manner and are sized based on the total system current desired. Current is supplied e.g. from an external dc power source (not shown) in amounts sufficient to provide the appropriate electrode reaction. For example, for wastewater treatment the current is sufficient to provide for oxidation of the contaminants at the anode. This aspect of the design allows lighter weight cables and bus bars, and less expensive power supplies to be used. Each monopolar electrode module is electrically connected to bus bar rods at each end of the stack (as shown in FIG. 6). As seen in FIG. 3, connecting wires 8 run from the anodes and cathodes to their respective bus bar rod 7. The bus bar rods 7 of adjacent stacks 13 are electrically connected in series by external connectors 14. See FIGS. 4 and 7. Because the wiring 8 is exposed to solution, care must be taken to avoid corrosion. The anode wiring and bus bar rods must be stable when polarised anodically. For acidic or weakly buffered neutral solutions, the preferred metal would be titanium (or titanium clad copper for the bus bar rods). The cathode wiring and bus bar rods can be made from a wider variety of less expensive metals, with the preferred metal often being stainless steel. The bus bar rods 7 extend through the cell wall and are sealed using standard compression fittings (male pipe adapters). Thus the connections 14 between the monopolar stack modules, which involve dissimilar metals (where galvanic corrosion might occur), are made outside of the cell. These external connections, putting the monopolar stack modules in series, are shown in FIGS. 4 and 7.

As discussed earlier, when connecting the monopolar stack modules 13 in series, care must be taken to avoid bypass currents between the stacks. Referring to FIG. 4, current can flow between the top cathode in the bottom stack (at 0 V) and the bottom cathode in the top stack (at 3 to 4 V). This particular case can result in corrosion of the more anodic cathode. A second problem would be the flow of current through the solution directly from the 6 to 8 V bus bar rod to the 0 V bus bar rod (this problem would become more severe as more stacks are used with greater voltage differences, see FIG. 7). This design solves this problem through the use of electrically insulating spacers 11 between the monopolar stack modules 13. This insulating spacer comprises a plastic plate sealed with a gasket 12, which fits between the monopolar stack modules 13 and extends at both ends past the bus bar rods 7 (as shown in FIGS. 3 and 4). Bypass currents are also decreased because of the lower total cell voltage obtained with this mixed monopolar/bipolar design versus a traditional bipolar design.

The cell is also designed to avoid the need for precision fabrication and to allow easy assembly, making it less expensive to manufacture. The modular electrode stacks 13 are assembled in a cell body 4, on which a lid 2 is attached, and to which inlet 1 and outlet 3 cowlings are fitted. Depending on requirements, these cell components can be bolted together with gaskets (as shown in FIG. 1) or welded. Gaskets 12 and 9 are fitted on one side of the modular stacks and at the top of the set of modular stacks, respectively, to minimise channelling without requiring precision cutting of the electrodes (as shown in FIG. 4).

Thus this design also achieves: a large electrode area in a compact volume, short anode to cathode distance with thin electrodes, minimal and easily sealed "through-wall" connections and fittings, smooth inlet/outlet flow patterns for minimal pressure drop, and a simple "tank cell" type fabrication with few parts and gaskets and minimal precision fabrication.

EXAMPLES

Test Cell Fabrication

To test the design, a cell representing roughly ¼ of the cell as shown in FIG. 6 was fabricated. Thus connection rods were placed at the cell inlet and one wire per electrode was used. Two electrode stacks were used to demonstrate the use of the monopolar/bipolar design with the insulating spacer (as shown in FIGS. 3 and 4). The electrodes were 30 cm by 3.8 cm and each stack module had nine mesh anodes and ten plate cathodes. The anodes were iridium dioxide coated titanium mesh (2 mm thick with 12.5 mm long way of design (LWD) and 7 mm short way of design (SWD)) stacked with insulating separators of ⅛₂" thick polypropylene screen with ⅛" square openings, and 1 mm thick type 304 stainless steel sheet cathodes, in an arrangement similar to Example #3 in FIG. 5. This gave a total anode area of about 4100 cm$^2$ in a cell 14.85 cm high, 8.9 cm wide, and 54.9 cm long (including inlet and outlet manifolds).

The cell body 4 was fabricated out of acrylic plastic to allow flow patterns to be observed. (A full-scale cell might be made from other materials such as welded polypropylene). Variations in the fabrication of the cell and electrodes were allowed for with a vertical gasket on one side of the cell between the electrode stacks and the cell wall to reduce fluid channelling around the electrodes. Wire connections were made by spot welding and the bus bar rods were sealed through the cell walls using polypropylene compression fittings (male pipe adapters). Titanium was used for the anode wiring and bus bar rods, and 304 stainless steel was used for the cathode wiring and bus bar rods.

At low flow rates and high currents, gas evolved at the electrodes accumulated in the top of the cell, and so for these conditions the cell outlet was slightly raised by tilting the cell (about 5 to 10 degrees) to help with the gas removal.

Example 1

System Mass Transfer Performance

Figure 8:
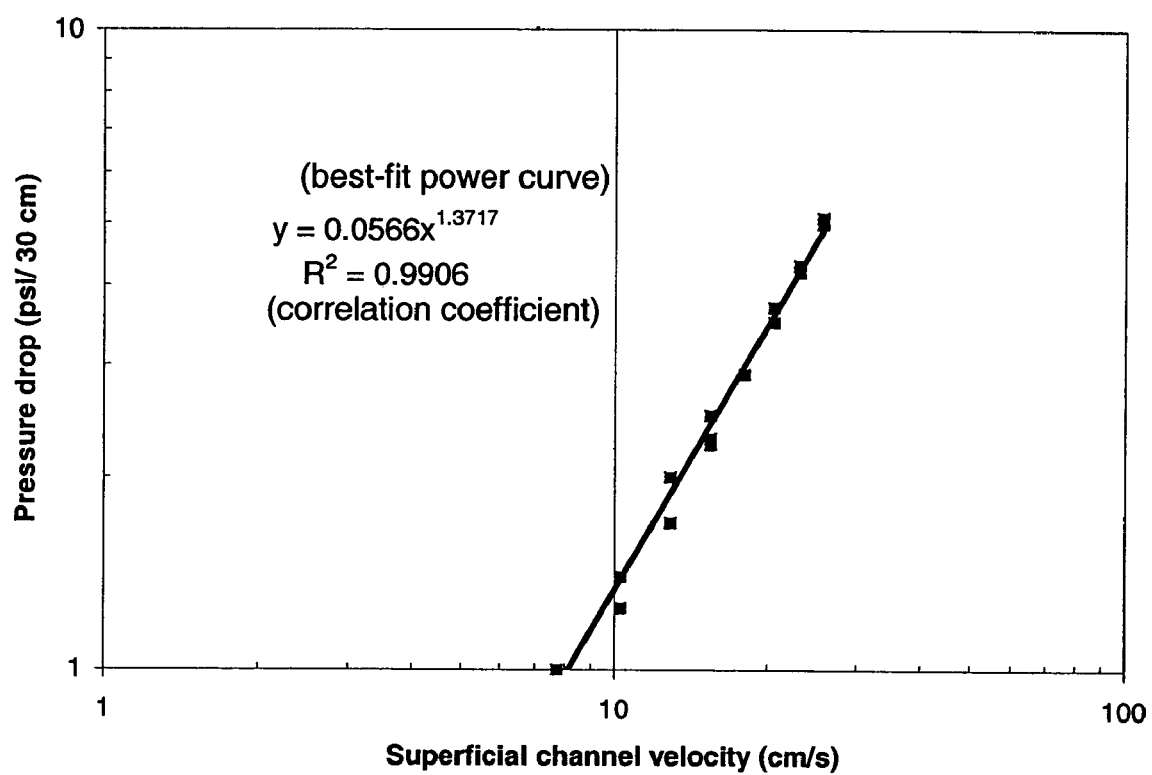
FIG. 8. Test cell results showing pressure drops for various superficial flow velocities through the electrode stack (30 cm pathlength).

A superficial channel fluid velocity of 25 cm/s was achieved with less than 5 psi pressure drop (hence a larger scale 1 m electrode length cell would have an acceptable inlet pressure drop of about 15 psi under these conditions). The superficial channel fluid velocity is, in this case, the entrance velocity to each of the channels formed by a working electrode and its pair of polymer mesh separators (as solid counter electrodes were used for this example). The pressure drops measured for various superficial velocities of water are shown in FIG. 8.

Figure 9:
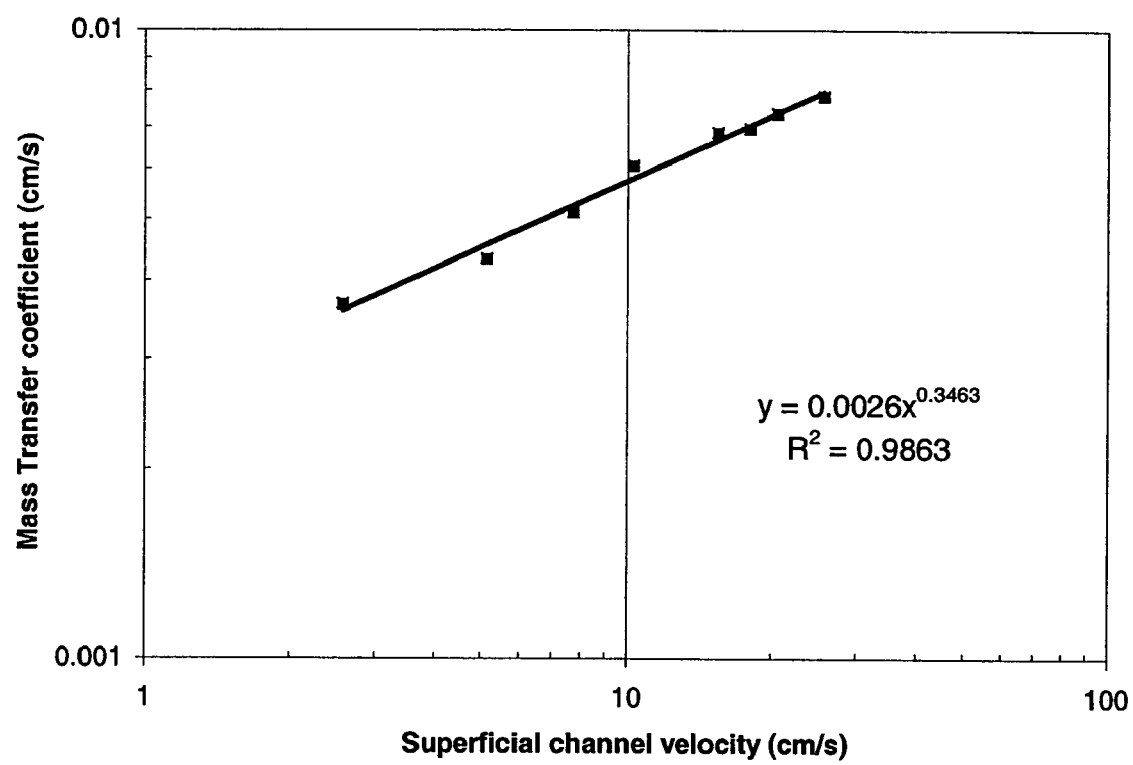
FIG. 9. Cell mass transfer performance at various flow superficial velocities.

The system mass transfer performance was measured using a ferri/ferrocyanide test solution. The ferri/ferrocyanide solution was made up with 6.1 mM ferricyanide, 1.0 mM ferrocyanide, and 0.2 M sodium sulphate giving a density of 1.02 g/ml. The cell voltage was increased until a current plateau was found. The cell was then held at a potential on the plateau and the flowrate was varied while the current was measured. In this manner average cell mass transfer data was obtained. The results of this testing are plotted in FIG. 9 showing the mass transfer coefficient as a function of the superficial solution velocity. The mass transfer coefficients obtained (varying from c.a. $3.7 \times 10^{-3}$ to $7.8 \times 10^{-3}$ cm/s) compare reasonably well with literature values for similar electrodes, such as those shown in C. J. Brown, F. C. Walsh, and D. Pletcher, "Mass Transfer and Pressure Drop in a Laboratory Filterpress Electrolyser", Transactions of the Institution of Chemical Engineers, Vol. 73, Part A, pp. 196–205, March (1995). This is especially good when one considers that, because this design is for low conductivity solutions only single rather than stacked anodes were used, which tends to result in a more constricted flow path.

Example 2

Test Run Showing Contaminant Removal

Figure 10:
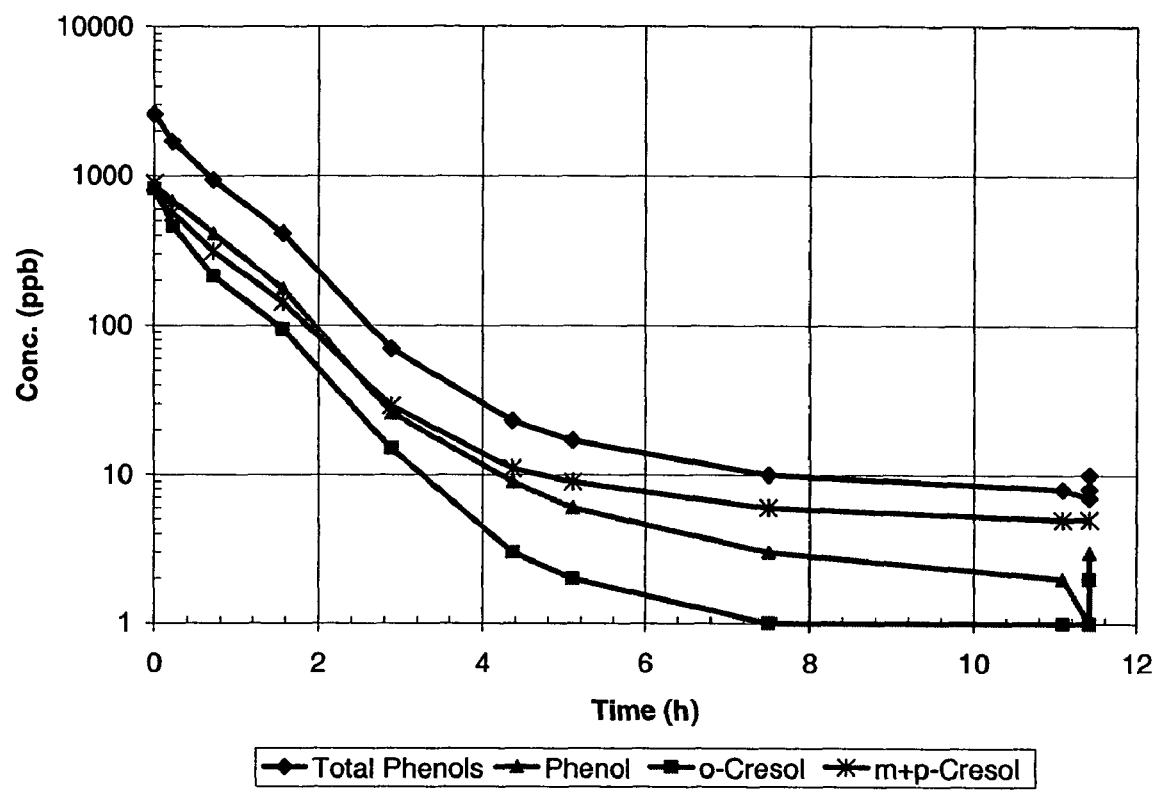
FIG. 10. Test cell water treatment results showing the removal of contaminants from low conductivity waste water down to very low concentrations.

A 10 L test solution of wastewater was treated using the test cell. The solution was recirculated at a flow rate of 7 USGPM (26.6 L/min) and with an applied current of 26 A. The concentrations of the key contaminants in the test solution (a selection of phenol compounds) were followed by sampling and analysis using solid phase microextraction then gas chromatography mass spectroscopy (SPME-GCMS). "Polyacrylate Film Fiber for Solid Phase Microextration of Polar Semivolatiles from Water", Application note 17, Supelco, Bellefonte, Pa., (1998) describes SPME-GCMS. The cell ran with an average pressure drop of 4.6 psi, and stack module voltages of 3.08 V and 3.09 V giving a cell voltage of 6.17 V (the solution resistance being 57 ohmcm). Over the course of the run the cell temperature increased from 23° C. to 41° C. As can be seen in FIG. 10 the phenols were rapidly removed with the total concentration of the phenols being reduced from about 2600 ppb to 10 ppb in around 7.5 h, demonstrating the ability of this cell design to treat solutions of very low concentration.

Example 3

Test Run Showing Cell Self-Heating

The cell was run in the same manner as described in Example 2, but with a different wastewater solution (31000 ppb total concentration of phenols, 4500 ppm COD, and a solution resistance of 116 ohmcm). In this case the system was insulated to retain the heat generated by the electrochemical cell and the pump. While this test solution started at around 15° C., by the end of the run the solution had reached 64° C., without the use of any supplemental heating. In fact, over the course of the experiment as the solution temperature increased, the cell voltage decreased from around 7.0 V to 6.2 V, resulting in a power savings. After running 13.75 h the total concentration of the phenols was reduced to about 60 ppb, and the COD to about 4200 ppm.

Example 4

Performance of the Series Monopolar Stack Module Design

The performance of the mixed monopolar/bipolar design can be assessed by comparing the stack voltages over the course of cell operation. Over 162 h of testing with various feed solutions, flow rates, and applied currents the voltages of the two monopolar stacks were found to remain in balance (average voltages of 3.393 V and 3.387 V). This indicates that non-uniformity's in the plate and mesh materials used (e.g. warped electrodes causing different anode cathode spacings) did not cause undue problems. Also any problems with current by-pass between the stacks would show up as a resistance in parallel with the bottom stack, leading to differing stack voltages. Thus it can be seen that no significant by-pass current flowed Similarly, no corrosion of the bottom cathode of the top stack module was visible, which would occur if significant by-pass current flowed and made parts of that electrode an anode in comparison to the lower stack module. Finally, the outflow of gas bubbles generated from the two modules was observed coming from the two stacks at similar rates indicating that the fluid flows to the two stacks were similar.

Example 5

Application Using Three Dimensional Type Electrodes

Testing was carried out using three dimensional electrodes made of layers of stainless steel screen welded together. One such anode was sandwiched between two similar cathodes, with the electrodes being separated by insulating plastic screen (similar to design #1 in FIG. 5, but with three dimensional cathodes as well). The screen had $\frac{1}{8}$" openings and was $\frac{1}{16}$" thick. The anode consisted of 5 layers (hence $\frac{5}{16}$" thick) and the cathodes of 3 layers each. The anode had a total area of about 81 cm2 and the cathodes 49 cm2. A solution of copper and cyanide in 0.1 M sodium hydroxide was recirculated through the electrodes from a 1 L reservoir. A constant potential was placed across the electrodes and currents of 60 mA or less were observed to flow. This caused cyanide to be oxidized at the anode, and copper to deposit as metal on the cathode and as oxide at the anode.

Over a period of 6 hours the concentration of the cyanide was decreased from 20 mM to 0.2 mM and of copper from 9 mM to 0.2 mM, with the copper observed to be evenly deposited over the electrodes. Thus it can be seen that: in higher conductivity solutions using lower current densities thicker three dimensional electrodes can be used, in higher pH solutions a wider variety of electrode materials can be used, and that the active electrode for treatment of contaminated water can be the anode, the cathode or both. It can also be understood how this electrode set-up can be easily installed in the disclosed cell design and thus benefit from the advantages of the disclosed cell design when operated on a larger scale.

REFERENCES

1. G. P. Vercesi, J. Rolewicz, Ch. Comninellis, E. Plattner, and J. Hinden, "Characterization of DSA-Type Oxygen Evolving Electrodes. Choice of Base Metal", Thermochimica Acta, vol. 176, pp. 31–47, (1991).
2. L. Carlsson, B. Sandegren, D. Simonsson, and M. Rihovsky, "Design and Performance of a Modular, Multipurpose Electrochemical Reactor", Journal of the Electrochemical Society, Vol. 130, No. 2, pp. 342–6, (1983).
3. S. Das Gupta, J. K. Jacobs, and S. Mohanta, U.S. Pat. No. 4,308,122, (1981).
4. J. G. Sunderland and I. M. Dalrymple, U.S. Pat. No. 5,690,806 (1997).
5. D. Pletcher and F. Walsh, "Industrial Electrochemistry", Chapman and Hall, London, U.K., (1993).
6. P. M. Robertson, F. Schwagner, and N. Ibl, "A New Cell for Electrochemical Porcesses", Journal of Electroanalytical Chemistry, Vol. 65, pp. 883–900, (1975).
7. R. J. Coin, L. M. Ernes, A. W. Getsy, K. L. Hardee, and M. J. Niksa, U.S. Pat. No. 5,972,181, (1999).
8. J. J. Kaczur and D. W. Cawlfield, U.S. Pat. No. 5,294,319, (1994).
9. C. J. Brown, F. C. Walsh, and D. Pletcher, "Mass Transfer and Pressure Drop in a Laboratory Filterpress Electrolyser", Transactions of the Institution of Chemical Engineers, Vol 73, Part A, pp. 196–205, March (1995).
10. "Polyacrylate Film Fiber for Solid Phase Microextration of Polar Semivolatiles from Water", Application note 17, Supelco, Bellefonte, Pa., (1998).
11. G. D. Zappi and N. L. Weinberg, U.S. Pat. No. 6,315,886, (2001).

The invention claimed is:

1. An electrochemical cell, comprising a plurality of electrode modules separated by electrically insulating spacers and electrically connected in series, each electrode module including a series of alternating anodes and cathodes separated by an electrically insulating porous material spacer, the electrodes being electrically connected in parallel, the cell further comprising an open-ended rectangular tank containing the electrode modules, one open end providing a liquid inlet and another open end providing a liquid outlet, the inlet and outlet being tapered to reduce inlet to outlet pressure drop and to provide substantially even and parallel fluid flow to the electrode modules, wherein the outlet is tapered upwardly and the inlet is tapered downwardly.

2. An electrochemical cell according to claim 1, wherein the anodes and cathodes are arranged in parallel and dimensioned to provide for liquid passage through the cell in a generally unimpeded manner to minimize inlet to outlet pressure drop.

3. An electrochemical cell according to claim 2, wherein the anodes and cathodes are in a form selected from the group consisting of plate form, mesh form, stacked mesh form, stacked screen form, and screen-wrapped plate form and more complex three dimensional structures.

4. An electrochemical cell according to claim 2, wherein the anode is fabricated as a catalytically active coating on a corrosion resistant metal substrate.

5. An electrochemical cell according to claim 4, wherein the substrate is of a metal selected from the group consisting of titanium, tantalum and zirconium, and wherein the coating is selected from the group consisting of platinum, iridium dioxide, mixed platinum and iridium dioxide, doped tin dioxide, lead dioxide, doped lead dioxide, substiocometric titanium dioxide and doped diamond.

6. An electrochemical cell according to claim 1, additionally comprising bus bars located within the cell and extending outside of the cell, for respectively electrically connecting the anodes and cathodes thereto within the cell, in parallel.

7. An electrochemical cell according to claim 6, wherein the bus bars are electrically connected outside of the cell, in series.

8. An electrochemical cell according to claim 7, wherein the bus bars are metal rods that are sealed where they pass through the cell.

9. An electrochemical cell according to claim 8, wherein sealing gaskets are provided between the modules and the tank to prevent channelling of liquid around the modules.

10. An electrochemical cell according to claim 9, wherein a seal is provided between the electrically insulating spacer and an adjacent electrode module, and wherein the spacer and seal both extend beyond the bus bars, to block by-pass currents from passing between the modules.

11. An electrochemical cell, according to claim 3, wherein the anode is in the form of a coated mesh material, the cathode is in the form of a plate and the spacer is in the form of a polymer mesh material.

* * * * *